(No Model.)

F. N. McDOWELL.
PIPE COUPLING SEAL.

No. 584,232.   Patented June 8, 1897.

Witnesses:
Fenton S. Belt.
J. A. Willson.

Inventor:
F. N. McDowell,
by H. B. Willson,
Attorney.

UNITED STATES PATENT OFFICE.

FELIX N. McDOWELL, OF TARENTUM, PENNSYLVANIA.

PIPE-COUPLING SEAL.

SPECIFICATION forming part of Letters Patent No. 584,232, dated June 8, 1897.

Application filed April 2, 1897. Serial No. 630,402. (No model.)

*To all whom it may concern:*

Be it known that I, FELIX N. MCDOWELL, a citizen of the United States, residing at Tarentum, in the county of Allegheny and State of Pennsylvania, have invented certain new and useful Improvements in Pipe-Coupling Seals; and I do declare the following to be a full, clear, and exact description of the invention, such as will enable others skilled in the art to which it appertains to make and use the same.

My invention has relation to pipe-couplings, and more particularly to that class of couplings for connecting the service or supply pipes to gas, water, and other meters, wherein the coupling is sealed by an authorized inspector to prevent the unlawful tampering with the same.

The object is to render said coupling absolutely secure after it has been sealed; and to this end the novelty consists in the construction, combination, and arrangement of the same, as will be hereinafter more fully described, and particularly pointed out in the claims.

In the accompanying drawings the same reference-characters indicate the same parts of the invention.

Figure 1:
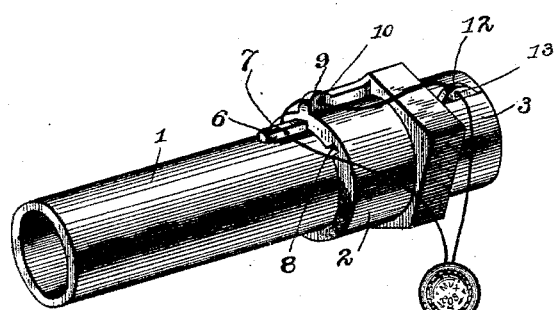
Figure 2:
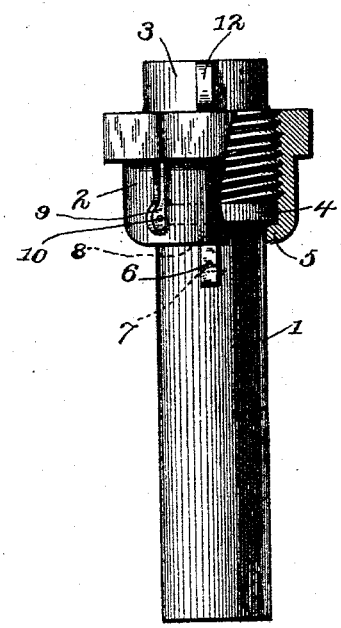

Figure 1 is a perspective view of my improved pipe-coupling. Fig. 2 is a detail view of the same.

1 represents the sleeve, 2 the socket, and 3 the nipple. The sleeve 1 is provided with the usual annular flange 4, which engages the internal flange 5 on the socket 2, the two parts forming the ordinary union of the trade. This sleeve is provided with an external longitudinal lug 6, provided with a transverse orifice 7. The socket-flange 5 is formed with a longitudinal slot 8, through which the lug on the sleeve passes. The socket is also provided with the external ear 9, having a transverse orifice 10. The nipple 3 is likewise provided with external ear 12, having transverse orifice 13.

In assembling the coupling the socket is first slipped over the sleeve, with the lug 6 on the sleeve alined with the longitudinal slot 8 in the socket and the position of the parts changed so as to throw the lug and slot out of alinement, and the joint is completed when the socket is screwed home on the nipple. A wire is then passed through the orifices in the lugs and the ends of the wires connected by the usual compression-seal, as shown. It will thus be seen that it is impossible to break the joint without destroying the seal.

Although I have specifically described the construction and relative arrangement of the several elements of my invention, I do not desire to be confined to the same, as such changes or modifications may be made as clearly fall within the scope of my invention without departing from the spirit thereof.

Having thus described my invention, what I claim, and desire to secure by Letters Patent, is—

1. A pipe-coupling comprising the sleeve 1 provided with the external integral lug 6, in combination with the socket 2 having the integral internal flange 5 formed with the slot 8, substantially as shown and described.

2. A pipe-coupling comprising the sleeve 1, provided with the external annular flange 4 and the external longitudinal lug 6, having the transverse orifice 7, in combination with the socket 2 having the integral internal flange 5 provided with the longitudinal slot 8, and the integral external ears 9, formed with transverse orifices 10, substantially as shown and described.

3. A pipe-coupling comprising the sleeve 1 provided with the external annular flange 4 and the external integral lug 6 having the transverse orifice 7, in combination with the threaded socket 2 having the internal annular flange 5, provided with the slot 8, and the integral external ears 9 formed with transverse orifices 10, and the nipple 3 provided with the integral external ears 12 having the transverse orifices 13, substantially as shown and described.

In testimony whereof I hereunto affix my signature in presence of two witnesses.

FELIX N. McDOWELL.

Witnesses:
GEO. L. RUTHERFORD,
JNO. F. HUMES.